HAINES & KIRKMAN.
Car Wheel.
No. 56,042.
Patented July 3, 1866.
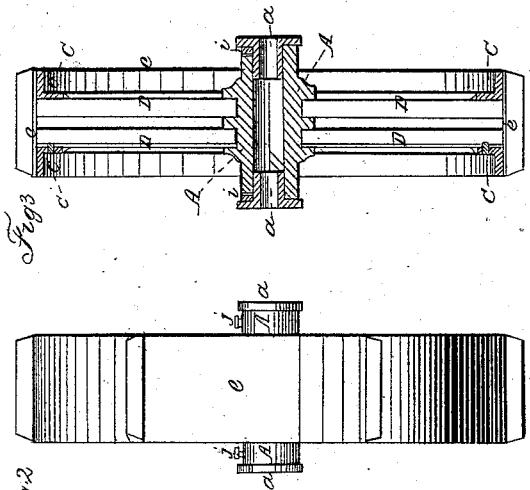
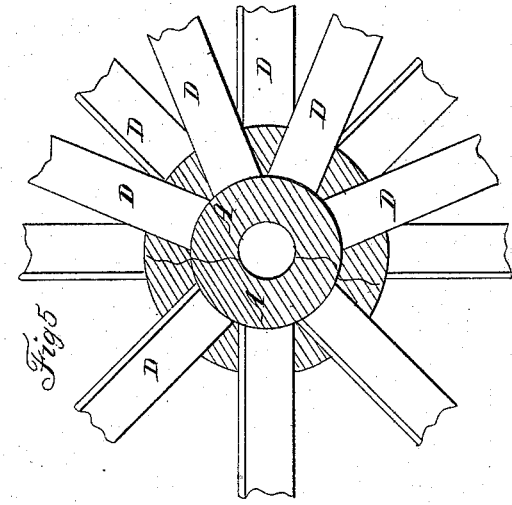
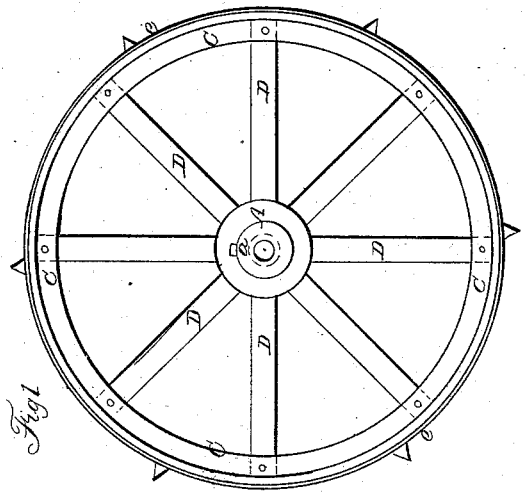
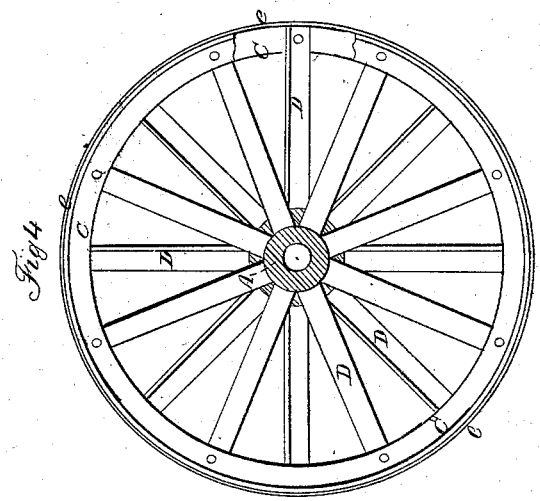
Witnesses
Inventor

UNITED STATES PATENT OFFICE.

ANSEL HAINES, OF PEKIN, AND JOHN KIRKMAN, OF KICKAPOO, ILLINOIS.

IMPROVEMENT IN THE CONSTRUCTION OF METAL WHEELS.

Specification forming part of Letters Patent No. 56,042, dated July 3, 1866.

*To all whom it may concern:*

Be it known that we, ANSEL HAINES, of Pekin, in the county of Tazewell and State of Illinois, and JOHN KIRKMAN, of Kickapoo, in the county of Peoria and State of Illinois, have invented a new and useful Improvement in the Construction of Metal Wheels; and we do hereby declare that the following is a full, clear, and exact description thereof, reference being had to the accompanying drawings, making a part of this specification, in which—

Figure 1 is a side view of a wheel which is made of angle-iron spokes and fellies. Fig. 2 is a front view of the wheel having a wide tread. Fig. 3 is a diametrical section through our wheel having two sets of spokes. Fig. 4 is a side view of a wheel having two sets of spokes, the hub being shown in section. Fig. 5 is a sectional view of the hub, showing the angle-iron spokes cast in the same.

Similar letters of reference indicate corresponding parts in the several figures.

The object of this invention is to produce a wheel for vehicles of all kinds which will retain its strength and true circular form, and which will not be injuriously affected by changes of temperature or other climatic changes.

The nature of our invention consists in constructing the spokes of a wheel, and also the fellies thereof, of angle-iron, and uniting the spokes to a cast-metal hub in the operation of producing this hub, the outer ends of the spokes being secured to the rim or felly of the wheel by rivets or bolts, as will be hereinafter described.

To enable others skilled in the art to understand our invention, we will describe its construction and operation.

In the accompanying drawings, A represents a cast-metal hub having one or more sets of spokes cast into it and projecting radially therefrom. The body of the hub, in which the ends of the spokes are cast, should be of sufficient thickness to hold the spokes firmly and securely in their places, and the central hole through the hub should be formed in a suitable manner to receive within it the metal bushing or thimbles *a a*.

D D represent the spokes of the wheel, which are made of angle iron or steel, which will afford the greatest strength with the least amount of weight. Those ends of the spokes which are cast in the body of the hub may be punched and bent, so that they will have a firm hold in the hub. The outer ends of the spokes are also punched and prepared for riveting them to the rim or felly or fellies, as the case may be.

The wheel which we have represented in Figs. 3, 4, and 5 has two sets of angle-iron spokes, secured by rivets or bolts to the fellies C C, which may be set at any desired distance apart, according to the width of the tread required.

If desirable, the angle-iron fellies may be brought close together for a narrow-rim wheel.

The spokes D, if two sets are used, are cast in the hub in such positions that each alternate spoke shall form a brace, and the spokes are so placed that the angle part of the iron is toward the front of the wheel and that of the braces is toward the back or inside of the wheel, the outer ends being riveted to the angle portions of the fellies.

In Fig. 3 the angle-iron spokes are in a plane with the sides of the wheel-tire; but in practice the spokes will be inclined inward or dished, so as to resist lateral strain.

The fellies C C are made from angle-iron or other metal bent into a circular form by machinery suitably adapted to the purpose, and secured together at the ends, so as to form hoops.

The tire *e* is applied upon the fellies after they are secured to the spokes by heating it and shrinking it on, and, if desirable, the tire and its fellies may be riveted together.

The tire and felly or fellies may be formed in one piece; but it is preferable to make these parts in separate pieces and shrink on the tire, as above described.

The bushing or tubes *a a* are fitted into the ends of the hub A, and secured in their places by the projections *i i*, cast on them, as shown in Fig. 3, which projections are fitted into corresponding recesses in the ends of the hub.

By thus bushing the hub the thimbles *a a* can be removed when worn out, and new ones substituted in their stead, thus preventing the hub of the wheel from wearing out so as to render the wheel useless.

We do not claim a wheel which has its rim or fellies strengthened by casting metal about an angle-iron ring; nor do we claim a wheel with cast-iron hub and tubular spokes; nor do we claim an axle with thimbles or sleeves attached to it; but What we do claim as our invention, and desire to secure by Letters Patent, is—

1. The combination of wrought-metal felly ring or rings, formed of angle-iron or angle-steel, of the shape substantially as shown, with wrought-metal spokes, formed of angle-iron or angle-steel, of the shape substantially as shown, the said felly ring or rings being encircled by a tire, and the said spokes being fastened by their outer ends to the flange of the felly ring or rings, and their inner ends cast into the metal hub, all substantially in the manner and for the purpose herein described.

2. The manner, substantially as herein described, of constructing and applying removable thimbles $a\ a$ to the cast-metal hub of the wheel, for the purpose set forth.

ANSEL HAINES.
JOHN KIRKMAN.

Witnesses:
  WILL. S. PRINCE,
  W. W. CLEMENS.